US012749082B1

(12) United States Patent
Rodriguez Bravo

(10) Patent No.: US 12,749,082 B1
(45) Date of Patent: Sep. 29, 2026

(54) PREVENTING SKIMMER ATTACKS

(71) Applicant: Kyndryl, Inc., New York, NY (US)

(72) Inventor: Cesar Augusto Rodriguez Bravo, Alajuela (CR)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 19/206,302

(22) Filed: May 13, 2025

(51) Int. Cl.
*G06Q 20/40* (2012.01)
*G06Q 20/20* (2012.01)
*G07F 19/00* (2006.01)

(52) U.S. Cl.
CPC ......... *G06Q 20/4016* (2013.01); *G06Q 20/20* (2013.01); *G07F 19/2055* (2013.01)

(58) Field of Classification Search
CPC . G06Q 20/4016; G06Q 20/20; G07F 19/2005
USPC .......................................................... 235/379
See application file for complete search history.

(56) References Cited

U.S. PATENT DOCUMENTS 6,434,238 B1 * 8/2002 Chaum ................. G07F 7/1008 380/45
10,574,698 B1 * 2/2020 Sharifi Mehr ...... H04L 63/1491
11,657,681 B1 * 5/2023 Rodriguez Bravo ........................ G07F 19/207 235/379
11,741,474 B2 * 8/2023 Allbright ........... G06Q 20/4016 705/44
11,757,914 B1 * 9/2023 Jakobsson ............... H04L 51/42 726/25
2007/0118483 A1 * 5/2007 Hill ...................... G06Q 20/382 705/64
2007/0220007 A1 * 9/2007 Narita ..................... G06F 21/31 707/999.009
2008/0198653 A1 * 8/2008 Brederlow ............. G11C 16/30 365/185.03
2009/0160617 A1 * 6/2009 Mullen .................. G06K 19/07 340/10.1
2012/0084866 A1 * 4/2012 Stolfo ................. H04L 63/1416 726/25
2017/0293906 A1 * 10/2017 Komarov .............. G06F 21/554
2020/0287935 A1 * 9/2020 Richards ............... H04L 63/168
2021/0056556 A1 * 2/2021 Matsunaga ........... H04W 12/06
2024/0236148 A1 * 7/2024 Bellekens ........... H04L 63/1491

FOREIGN PATENT DOCUMENTS

IN 202311039771 A 7/2023

OTHER PUBLICATIONS

Mell et al., "The NIST Definition of Cloud Computing", NIST, Special Publication 800-145, Sep. 2011, 7 pages.
(Continued)

*Primary Examiner* — Allyson N Trail
(74) *Attorney, Agent, or Firm* — Erik Swanson; Andrew M. Calderon; Calderon Safran & Wright P.C.

(57) ABSTRACT

A computer-implemented method including: connecting, by a computing device, to an access point of a wireless network which is being used by a skimmer device; processing, by the computing device, information of a financial card obtained from an electronic processing terminal received through the access point; creating, by the computing device, fake information of the financial card; and sending, by the computing device, the fake information to the skimmer device through the access point.

19 Claims, 5 Drawing Sheets

(56) References Cited

OTHER PUBLICATIONS

Anonymous, “Card Skimming Logic Remediation”, https://ip.com/, IPCOM/000268023, Dec. 15, 2021, 3 pages.
Greta et al., “16 Insane ATM Scams That You Wouldn’t Even Notice.” https://www.boredpanda.com/how-to-spot-atm-scam/?utm_source=google&utm_medium=organic&utm_campaign=organic, Jun. 23, 2017, 31 Pages.
Anonymous, “DgiWorks AntiSkimming System (DGI-AS).” https://www.antiskimmingsystem.com, DGI Works Teknoloji San. ve Tic. A.$. 16 Pages, 2020.
Nate, “Gas Pump Skimmers.” https://learn.sparkfun.com/tutorials/gas-pump-skimmers/all, Page Accessed May 12, 2025, 30 Pages.
Poole et al., “Skimmer Scanner: A Gas Pump Skimmer Detection App by SparkX” https://github.com/sparkfunX/Skimmer_Scanner, May 29, 2018, 4 Pages.
Whittaker, “This new app can detect wireless credit card skimmers at gas pumps ” https://www.zdnet.com/article/this-new-app-can-detect-wireless-credit-card-skimmers-at-gas-pumps/, ZDNET, Sep. 22, 2017, 7 Pages.
Anonymous, https://www.creditcards.com/credit-card-news/bluetana-app/, Page Accessed May 12, 2025, 2 Pages.
Krebs, “Meet Bluetana, the Scourge of Pump Skimmers” hhttps://krebsonsecurity.com/2019/08/meet-bluetana-the-scourge-of-pump-skimmers/, Aug. 14, 2019, 16 Pages.
Waqas, “Bluetana app detects gas pumps card skimmers in 3 seconds” https://www.hackread.com/bluetana-app-detects-gas-pumps-card-skimmers-in-3-seconds/, Aug. 17, 2019, 9 Pages.
Whittaker, “A new app can detect Bluetooth credit card skimmers on gas pumps” https://techcrunch.com/2019/08/14/ bluetana-card-skimmer-gas-pump/, Aug. 14, 2019, 4 Pages.

* cited by examiner

PREVENTING SKIMMER ATTACKS

BACKGROUND

Aspects of the present invention relate generally to preventing skimmer attacks and, more particularly, to systems and methods to prevent wireless technology enabled skimmer attacks.

Wireless technology enables devices to seamlessly connect devices together through the Internet. For example, wireless fidelity (Wi-Fi) enables the devices to seamlessly connect the devices together through the Internet by using radio waves. Skimming device used to illegally obtain personal information such as credit card information during a credit card transaction can use wireless technologies.

SUMMARY

In a first aspect of the invention, there is a computer-implemented method including: connecting, by a computing device, to an access point of a wireless network which is being used by a skimmer device; processing, by the computing device, information of a financial card obtained from an electronic processing terminal received through the access point; creating, by the computing device, fake information of the financial card; and sending, by the computing device, the fake information to the skimmer device through the access point.

In another aspect of the invention, there is a computer program product including one or more computer readable storage media having program instructions collectively stored on the one or more computer readable storage media. The program instructions are executable to: connect to an access point of a wireless network; clone information of the access point; connect to the access point using the cloned information; obtain financial information of one or more financial transactions processed through the access point; create fake information of the financial information of the one or more financial transactions; and send the fake information to a third party through the access point using the cloned information.

In another aspect of the invention, there is system including a processor, a computer readable memory, one or more computer readable storage media, and program instructions collectively stored on the one or more computer readable storage media. The program instructions are executable to: communicate with an access point that obtains financial information from an electronic financial transaction; identify a network card of the access point that is being used to obtain the financial information; clone details of the network card which allows communication with a skimmer device by a third party device through the access point; connect to the access point to obtain the financial information; create fake financial information associated with the financial information; and send the fake financial information to the skimmer device through the access point using the cloned details of the network card.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
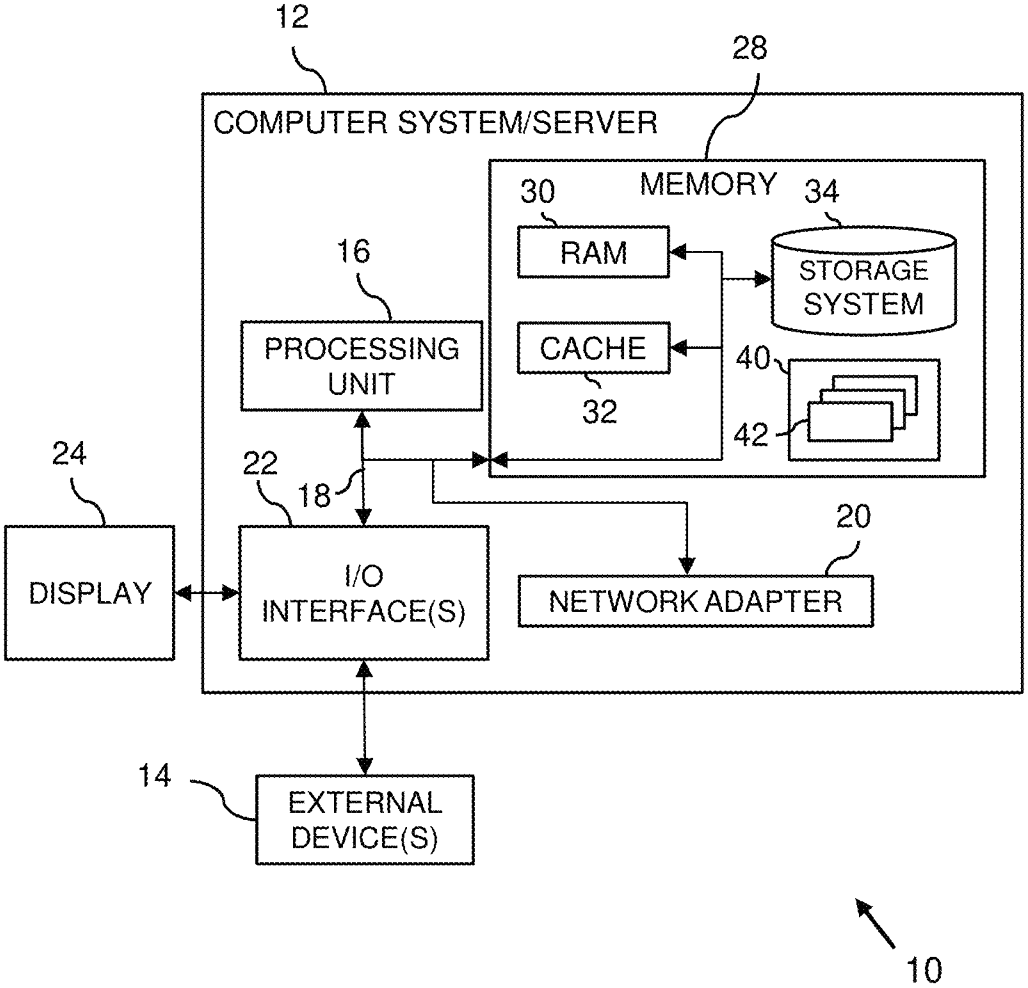
FIG. 1 depicts a cloud computing node according to an embodiment of the present invention.

Aspects of the present invention relate generally to preventing skimmer attacks and, more particularly, to systems and methods to prevent wireless technology enabled skimmer attacks. The systems and methods described herein can also be implemented as a computer program product. According to aspects of the present invention, the systems, methods and computer program product prevent fraudulent credit card or debit card transactions (e.g., also referred to as financial cards) by cloning details of a network card (e.g., access point of the skimmer), connecting to an access point (AP) posing as the skimmer and, in turn, creating fake or incorrect (e.g., "bait") credit card or debit card details which are sent over a wireless network to the attacker, e.g., a server which the user is connected to in order to gain access to the information of the skimmer. In this way, it is possible to prevent skimmer attacks that would otherwise result in loss of billions of dollars to the banking/financial industry and/or owners of the credit cards or debit cards.

Aspects of the present invention provide a technical feature (e.g., technical solution) to a technical problem with a practical application of providing tools to prevent fraudulent transactions using credit card or debit card information obtained over a Wi-Fi network using skimmer technology. As should be understood by those of skill in the art, skimmers are illegal devices attached to or connected over a Wi-Fi network to card readers at automatic teller machines (ATMs) or other point of sale (POS) terminals (also known as electronic processing terminal(s)). These skimmers are capable of stealing card or debit card data including, for example, PINs, expiration dates and card numbers. The embodiments of the present invention provide a technical solution to preventing such attacks by creating fake card information and providing this information to the attacker, without the attacker realizing they are receiving fake information.

By way of example, after detection of a Wi-Fi skimmer at POS terminal, ATM or other payment terminal (e.g., gas pumps), for example, the systems, methods and computer program product may clone details of the network card (e.g., access point) at the location of the skimmer and, in embodiments, connect to the access point (AP) posing as the skimmer. Once connected to the AP, the systems, methods and computer program product provide a security solution by gathering the real credit card or debit card information of the user, processing this data, and creating fake (e.g., "bait") credit card or debit card details associated with the real information. The fake credit card or debit card details may be sent at random intervals to the attacker over the wireless network through the access point, posing the fake information as real credit card or debit card data of the user. In embodiments of the present invention, the fake information can be sent to the attacker, via a server they are connecting to with the skimmer, at predetermined intervals, e.g., several each hour or other amounts and/or time intervals. This will effectively mimic actual transaction time periods, thus "tricking" the attacker into thinking that they have received the real credit card or debit card data when, in reality, they have received incorrect credit card or debit card information. The fake credit card or debit card information may also be sent over the wireless network, e.g., Wi-Fi, to an issuing bank (and/or other clearing house and/or appropriate agencies or administrators) so they can monitor for any transactions using the fake credit card or debit card details and, as appropriate, block any such transaction which uses the fake credit card or debit card details. In this way, it is possible to prevent skimmer attacks that would otherwise result in loss of billions of dollars to the backing/financial industry and end users, e.g., owners of the credit cards or debit cards. Accordingly, it is now possible to provide increased security capabilities to clients.

As should be understood by those of skill in the art, the above technical solutions are well rooted in computer technology and cannot be performed in the human mind or by pen and paper. For example, intercepting credit card or debit card information and sending fake credit card or debit card information over a wireless network cannot be done in the human mind or by pen and paper. In addition, it is only possible to access Wi-Fi skimmers and APs using computer technology.

It should be understood that, to the extent implementations of the present invention collect, store, or employ personal information provided by, or obtained from, individuals (for example, credit card or debit card information) such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the present invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the present invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
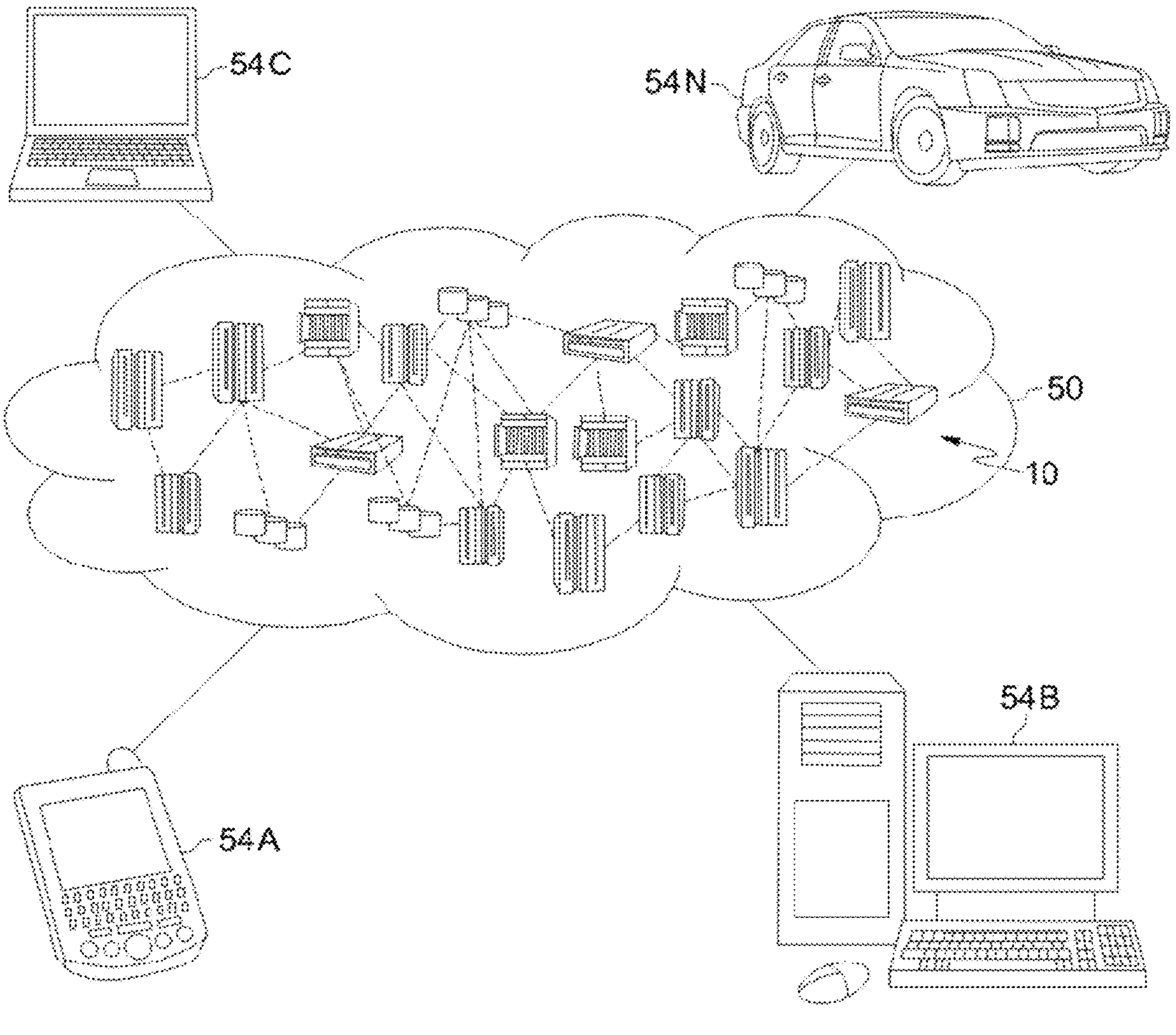
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
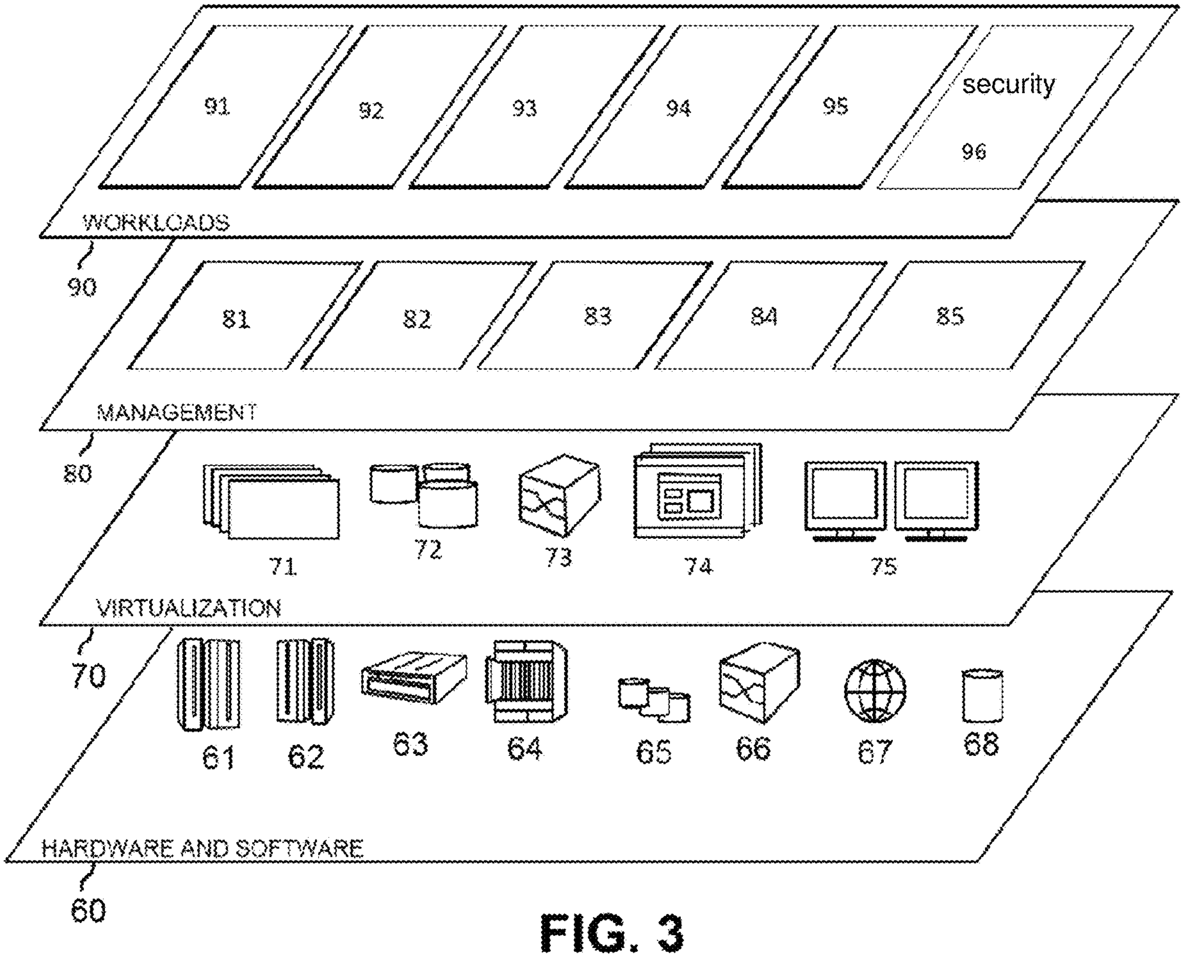
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the present invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security 96.

Implementations of the present invention may include a computer system/server 12 of FIG. 1 in which one or more of the program modules 42 are configured to perform (or cause the computer system/server 12 to perform) one of more functions of the security 96 of FIG. 3. For example, the one or more of the program modules 42 may be configured to prevent skimmer attacks and, more particularly, prevent wireless technology enabled, e.g., Wi-Fi, skimmer attacks.

More specifically, the one or more of the program modules 42 may be configured to: clone the details of a network card being used by the skimmer; connect to the AP as the skimmer device; gather and process credit card or debit card information; create fake credit card details (e.g., fake information such as fake credit card number, expiration date, security code, etc.); send the fake credit card or debit card information at random intervals to the attacker via the AP and the server; and send the fake credit card or debit card information to an issuer of the user's credit card or debit card so that the issuer can flag the fake information and monitor for any transaction that use the fake information. In this way, the issuer of the credit card or debit card can prevent fraudulent transfers. The issuer of the credit card or debit card can also provide incorrect information back to the attacker. For example, the issuer of the credit card or debit card can display a plurality of errors to the attacker such as, e.g., zero balance, ATM is out of money, etc., which will also prevent the withdrawal of money or prevent fraudulent transactions from occurring, while deceiving the attacker into thinking that there is nothing wrong with the credit card or debit card information.

Figure 4:
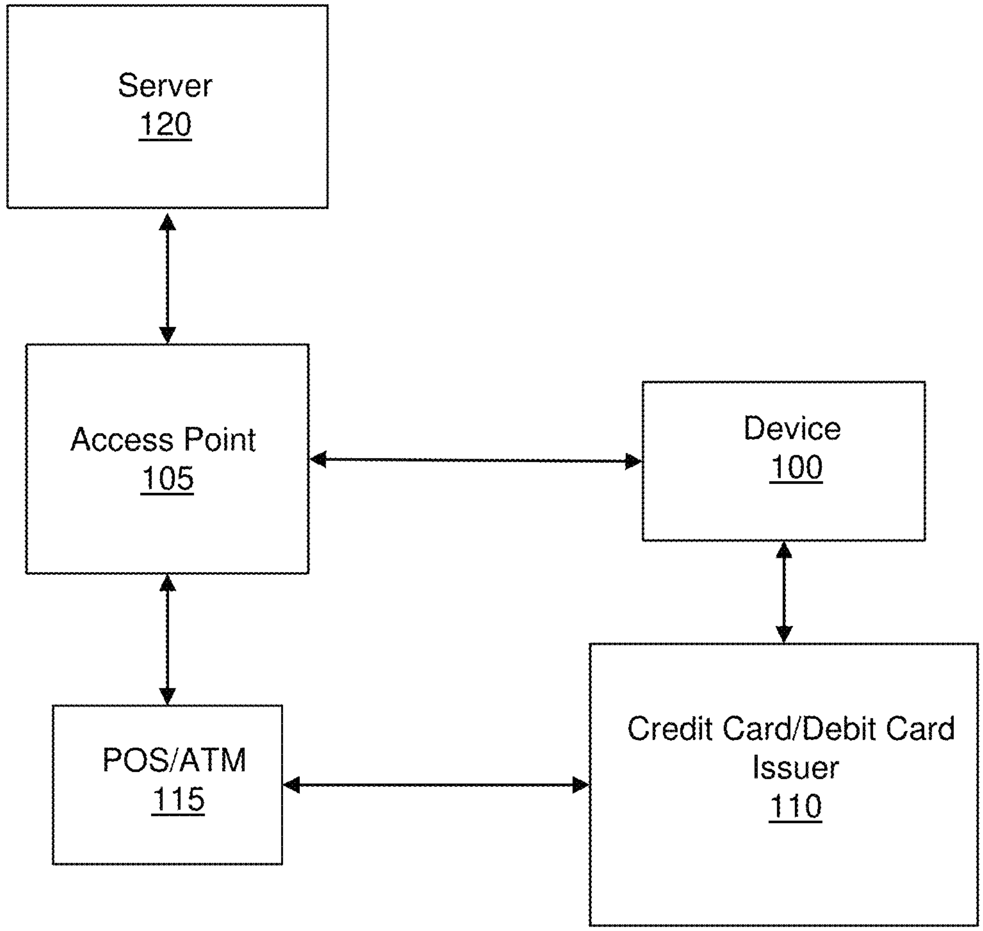
FIG. 4 shows a block diagram of an exemplary environment in accordance with aspects of the present invention.

FIG. 4 shows a block diagram of an exemplary environment in accordance with aspects of the present invention. In embodiments, the different devices may comprise one or more program modules such as program modules 42 described with respect to FIG. 1. The different devices may be representative of different modules which may include additional or fewer modules than those shown in FIG. 4. In embodiments of the present invention, the separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments of the present invention, the program modules and/or devices include device 100 that communicates with an access point 105 and the issuer of a credit card or debit card 110. The access point (AP) 105 and the issuer of a credit card or debit card 110 also communicate with the POS/ATM or other point of sale terminal 115 (e.g., electronic financial processing terminal). In embodiments of the present invention, the device 100 and the issuer 110 may be the same party which can provide the functionality described herein. As such, although some functionality is specifically disclosed herein as being performed by the either the device 100 or the issuer 110, one of skill in the art will readily understand that such functionality can be performed by either the device 100 or the issuer 100 or any combination thereof.

For example, the device 100 will identify a network card of an AP 105 that is being used by the skimmer and clone the details of the network card. The device 100 will connect to the AP 105 as the skimmer device and gather and process credit card or debit card information at the POS/ATM 115. The device 105 will create fake information associated with the credit card or debit card, which is sent at random intervals back to the skimmer via the AP 105 and sever 120. In embodiments of the present invention, the device 100 can send numerous fake credit card or debit card information to the attacker, at random intervals, effectively mimicking different transactions that may have occurred at the POS/ATM 115. The fake information can be sent to the attacker, e.g., user of the skimmer, at predetermined intervals, e.g., several each hour or other amounts and time intervals, that effectively mimic actual transaction time periods at the POS/ATM 115. By sending the details at random, the attacker will not realize that the credit card or debit card information has been intercepted and fake information is being sent to the attacker; instead, the attacker will believe that different credit card or debit card information from other users are simply being used at the POS/ATM or other point of sale terminal 115. These same functions can also be performed directly by the issuer 110 or any party authorized by the issuer such as a service provider.

In embodiments of the present invention, the AP 105 will provide the fake information to the server 120 being used by the attacker. The device 100 will also send this fake information to the issuer 110 by connecting to a secure API over a wireless network, e.g., Wi-Fi. The issuer 110 can save this fake information in a secure database for its later use. This will enable the issuer 110 to tag this information as fake, and when such information is detected during routine monitoring of transactions, it can determine that a fraudulent transaction is occurring using the fake details. As such, upon identification of the fake details, the issuer 110 can block the account, preventing such transaction from occurring and, in embodiments of the present invention, alert proper authorities of such a fraudulent transaction. The issuer 110 can also effectuate additional actions such as requesting the ATM 115 (and other POSs if they have the capability) to take a photograph of the attacker while using the ATM 115. This photograph can be sent to the proper authorities in order to identify and pursue the attacker. In addition, the issuer 110 can also provide false information back to the attacker such as zero balance, etc., on the credit card or debit card. These same functions can also be performed directly by the device 110 or any party authorized by the device 100 such as a service provider.

Figure 5:
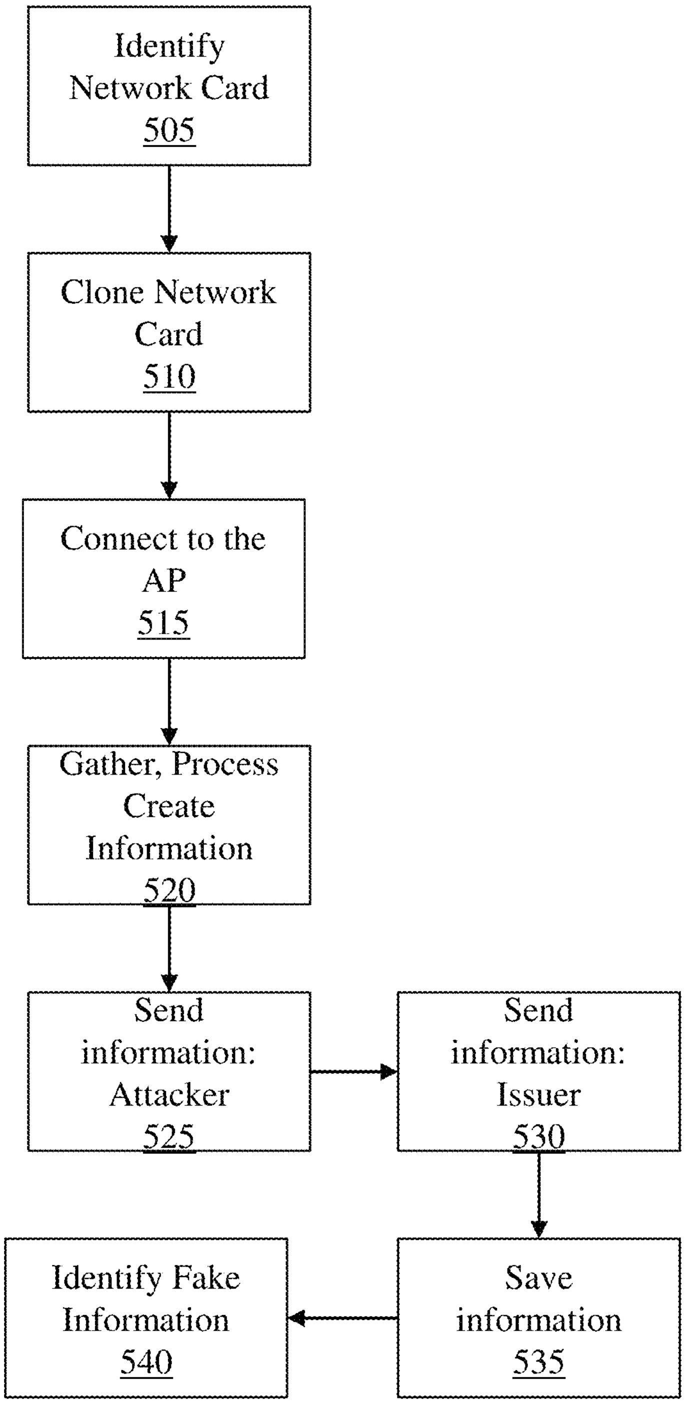
FIG. 5 shows a flowchart of an exemplary method in accordance with aspects of the present invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system identifies a network card which is being used by a skimmer to obtain credit card or debit card information. At 510, the system clones the details of the network card. For example, the system can clone the Service Set Identifier (SSID) of the access point, which is the name of the wireless network. This allows the cloned information to broadcast and identify itself to nearby devices, e.g., skimmers, allowing connection to the skimmer without the knowledge of the attacker, e.g., user of the skimmer. At step 515, the system will connect to the AP as the skimmer device. At step 520, the system gathers and processes the credit card information at the POS/ATM and creates fake information about credit card or debit card details. The fake credit card or debit card information can be generated by an algorithm. For example, to generate a random, yet potentially valid, credit card number using an algorithm, it is possible to utilize the Luhn algorithm to create a number that passes validation checks, though it will not link to any real card or account.

As should be understood by those of skill in the art, the Luhn algorithm is a checksum algorithm used to validate credit card numbers and other identification numbers. The Lund algorithm can generate random numbers of the correct length for the card type, for example. By way of examples, the Lund algorithm can double every other digit, subtract a predetermined number, e.g., 9, as necessary, sum all digits and/or calculate a check digit that when added to the sum, makes the sum divisible by 10, as examples and which should be known by those of skill in the art.

At step 525, the fake information is sent at random intervals back to the skimmer via the AP. In embodiments of the present invention, the system can provide the fake credit card or debit card information to the attacker, at random, mimicking different transactions. The randomness may be, for example, at random time intervals, at predetermined time intervals or based on other parameters. These other parameters may include, for example, every time a person is using an ATM as determined by a motion sensor or camera, for example.

At step 530, the fake information is also sent to the issuer of the credit card or debit card that is associated with the real card information. The fake information can be sent to the issuer via a secure API over the wireless network, e.g., Wi-Fi. At step 535, the issuer saves this information in a secure database for future lookup. This fake information can be tagged as fake, and when such information is detected during routine monitoring of transactions, determining that a fraudulent transaction is occurring using the fake details.

At step 540, upon identification of the fake information received from an AP of an ATM or other POS being used by the attacker, the issuer of the credit card or debit card can block the account, preventing such transaction from occurring. At this step, it is also possible for the system to alert the proper authorities of such a fraudulent transaction or take other actions, e.g., take a photograph of the user of the fake information and send such information to the proper authorities to identify and pursue the attacker.

In embodiments, a service provider could offer to perform the processes described herein. In this case, the service provider can create, maintain, deploy, support, etc., the computer infrastructure that performs the process steps of the present invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the present invention provides a computer-implemented method, via a network. In this case, a computer infrastructure, such as computer system/server 12 (FIG. 1), can be provided and one or more systems for performing the processes of the present invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

connecting, by a computing device, to an access point of a wireless network which is being used by a skimmer device;

processing, by the computing device, information of a financial card obtained from an electronic processing terminal received through the access point;

creating, by the computing device, fake information of the financial card;

sending, by the computing device, the fake information to the skimmer device through the access point; and identifying a network card associated with the access point and cloning information of the network card.

2. The computer-implemented method of claim 1, further comprising sending of the fake information sent to an issuer of the financial card.

3. The computer-implemented method of claim 1, wherein the cloned information of the network card is used to connect to the access point and send the fake information to the skimmer device, mimicking the electronic processing terminal.

4. The computer-implemented method of claim 3, wherein the cloned information of the network card is sent by a third party device.

5. The computer-implemented method of claim 1, wherein the fake information is sent to the skimmer device at random time intervals.

6. The computer-implemented method of claim 5, wherein the fake information is sent to a server used by the skimmer device through the access point.

7. The computer-implemented method of claim 1, wherein the financial card is a credit card or a debit card.

8. The computer-implemented method of claim 1, wherein the electronic processing terminal is an automated teller machine (ATM).

9. The computer-implemented method of claim 1, wherein the electronic processing terminal is a point of sale terminal (POS).

10. The computer-implemented method of claim 1, wherein the computing device includes software provided as a service in a cloud environment.

11. A computer-implemented method comprising:

connecting, by a computing device, to an access point of a wireless network which is being used by a skimmer device;

processing, by the computing device, information of a financial card obtained from an electronic processing terminal received through the access point;

creating, by the computing device, fake information of the financial card;

sending, by the computing device, the fake information to the skimmer device through the access point; and receiving and saving the fake information in a secure database and, upon receipt of the fake information from an attacker, determining that a fraudulent transaction is occurring and blocking the fraudulent transaction.

12. A computer program product comprising one or more computer readable storage media having program instructions collectively stored on the one or more computer readable storage media, the program instructions executable to:

connect to an access point of a wireless network;

clone information of the access point;

connect to the access point using the cloned information;

obtain financial information of one or more financial transactions processed through the access point;

create fake information of the financial information of the one or more financial transactions; and send the fake information to a third party through the access point using the cloned information.

13. The computer program product of claim 12, wherein the cloned information is a network card of the access point, which allows information to be sent and received from the access point to the third party.

14. The computer program product of claim 13, wherein the third party is a user which obtained the fake information from the skimmer device.

15. The computer program product of claim 13, wherein the third party is an issuer of the financial information.

16. The computer program product of claim 15, wherein the financial information includes information of a credit card or debit card, and the fake information of the credit card or debit card is used by the issuer to stop a fraudulent transaction.

17. The computer program product of claim 12, wherein the fake information is sent to a skimmer device through the access point using the cloned information at random intervals.

18. A system comprising:

a processor, a computer readable memory, one or more computer readable storage media, and program instructions collectively stored on the one or more computer readable storage media, the program instructions executable to:

communicate with an access point that obtains financial information from an electronic financial transaction;

identify a network card of the access point that is being used to obtain the financial information;

clone details of the network card which allows communication with a skimmer device by a third party device through the access point;

connect to the access point to obtain the financial information;

create fake financial information associated with the financial information; and send the fake financial information to the skimmer device through the access point using the cloned details of the network card.

19. The system of claim 18, further comprising monitoring the access point for the fake information and, upon receipt of the fake information, block a transaction using the fake financial information.

* * * * *